United States Patent
Sako et al.

(10) Patent No.: US 6,657,700 B2
(45) Date of Patent: Dec. 2, 2003

(54) REFLECTION-TYPE AND TRANSMISSION-TYPE LIQUID CRYSTAL DISPLAY DEVICES

(75) Inventors: Teiyu Sako, Kuki (JP); Seiichi Mitsui, Kashiwa (JP)

(73) Assignee: Sharp Kabushiki Kaisha, Osaka (JP)

(*) Notice: Subject to any disclaimer, the term of this patent is extended or adjusted under 35 U.S.C. 154(b) by 82 days.

(21) Appl. No.: 09/736,202

(22) Filed: Dec. 15, 2000

(65) Prior Publication Data
US 2001/0004279 A1 Jun. 21, 2001

(30) Foreign Application Priority Data
Dec. 15, 1999 (JP) .......................................... 11-355274

(51) Int. Cl.⁷ ............................................. G02F 1/1335
(52) U.S. Cl. .................... 349/158; 349/57; 349/156; 349/110; 349/112
(58) Field of Search ............................... 349/158, 156, 349/112, 110, 96, 201, 202, 57

(56) References Cited

U.S. PATENT DOCUMENTS

| | | | | |
|---|---|---|---|---|
| 4,389,096 A | * | 6/1983 | Hori et al. | 350/339 |
| 4,729,640 A | * | 3/1988 | Sakata | 350/348 |
| 5,220,444 A | | 6/1993 | Mitsui et al. | |
| 5,559,617 A | | 9/1996 | Mitsui et al. | |
| 5,684,551 A | | 11/1997 | Nakamura et al. | |
| 5,691,791 A | | 11/1997 | Nakamura et al. | |
| 5,847,789 A | | 12/1998 | Nakamura et al. | |
| 6,108,064 A | | 8/2000 | Minoura et al. | |
| 6,323,970 B1 | * | 11/2001 | Popovich | 359/4 |
| 6,331,878 B1 | * | 12/2001 | Takahara | 349/5 |

FOREIGN PATENT DOCUMENTS

| | | |
|---|---|---|
| JP | A58501631 | 9/1983 |
| JP | A6317702 | 11/1994 |
| JP | A7092507 | 4/1995 |
| JP | A897006 | 4/1996 |
| JP | A8087006 | 4/1996 |
| JP | A8114797 | 5/1996 |
| JP | A9152579 | 6/1997 |
| JP | B2724596 | 12/1997 |
| JP | A1062778 | 3/1998 |
| JP | A10062778 | 3/1998 |
| JP | 10-253954 | * 9/1998 |
| WO | A1-8301016 | 3/1983 |

* cited by examiner

*Primary Examiner*—Robert H. Kim
*Assistant Examiner*—Thoi V. Duong
(74) *Attorney, Agent, or Firm*—Birch, Stewart, Kolasch & Birch, LLP (57) ABSTRACT

A reflection-type liquid crystal display device includes upper and lower substrates which respectively have upper and lower electrodes, the upper and lower substrates being arranged in parallel with the upper electrode facing the lower electrode, and a liquid crystal layer sandwiched between the upper and lower substrates, the upper substrate being transparent and having protruding portions adjacent to the liquid crystal layer, each protruding portion having a surface downwardly inclined to defined a prism, the lower substrate having light reflection portions and light absorption portions, wherein when an electric field is applied to the liquid crystal layer, incident light into the upper substrate is selectively directed to the light reflection portions and the light absorption portions by means of the protruding portions and the liquid crystal layer.

8 Claims, 9 Drawing Sheets

REFLECTION-TYPE AND TRANSMISSION-TYPE LIQUID CRYSTAL DISPLAY DEVICES

CROSS-REFERENCE TO RELATED APPLICATION

This application is related to Japanese Patent Application No. Hei 11(1999)-355274 filed on Dec. 15, 1999, whose priority is claimed under 35 USC §119, the disclosure of which is incorporated by reference in its entirety.

BACKGROUND OF THE INVENTION

1. Field of the Invention

The present invention relates to a light modulation type liquid crystal display device having a high brightness and a high contrast ratio, and more particularly, a reflection-type direct-viewing liquid crystal display, a transmission-type direct-viewing liquid crystal display, and a projection-type liquid crystal projector.

2. Description of the Related Art

A display systems of liquid crystal display devices, a TN (Twisted Nematic) mode and a STN (Super-twisted Nematic) mode which make use of birefringence and optical rotation of a liquid crystal are generally adopted currently. Since these systems make use of such birefringence and optical rotation of the liquid crystal, it is necessary to use two sheets of polarizers and hence, light absorption loss amounts to approximately 60%, which darkens a display. On the other hand, another system which does not use the polarizers has been proposed. It is a guest-host (G-H) system which is a system in which a dichroic dye is added to a liquid crystal, or a system which makes use of scattering of light as represented by a dynamic scanning mode, a phase change mode and a polymer dispersion mode. Since the later system does not suffer from the loss of light caused by the polarizers, it enable a brighter display compared with the former system.

In case p-type dichroic dye is used in the above-mentioned guest-host system, the light absorption of the dichroic dye becomes maximum when the polarizing direction of light is parallel to a long axis of molecules, and becomes minimum when an optical path of the light and the long axis of molecules are arranged parallel to each other (in case an n-type dichroic dye is used, an opposite phenomenon occurs). Accordingly, a liquid crystal display element adopting a popular homogeneous orientation can obtain a two-value state. That is, when an electric field is not applied, a colored display is obtained by horizontal alignment of the liquid crystal molecules and the dichroic dye, while when the electric field is applied, a colorless display is obtained by vertical alignment of the liquid crystal molecules and the dichroic dye.

Here, to increase the brightness and the contrast without using polarizers, there has been known a method which uses a guest-host liquid crystal layer having a multi-layered structure, and a method which makes use of a phase change mode of a cholesteric liquid crystal. However, the fabrication of a panel having the multi-layered structure is difficult. Further, this method gives rise to other problems such as an expensive fabrication cost and a double reflection of images. Further, the phase change mode of the cholesteric liquid crystal is inferior to the TN mode in basic characteristics such as contrast, drive voltage, response speed and the like. Therefore, these methods have not been put into practice.

On the other hand, the display system which makes use of the scattering of light, in general, includes a reflection-type liquid crystal display device having a black light absorption body in the back. Due to such a constitution, when a liquid crystal layer is in the transparent state, a black display is realized, while when the liquid crystal is in the scattered state, a white display is realized due to the backward scattering of light. Since the dynamic scattering mode or the phase change mode of the above system is not practical in terms of reliability, response speed, drive voltage and the like, a polymer dispersion mode has been currently extensively studied. For example, Japanese Patent 2,724,596 and Japanese Patent re-publication through PCT 501,631/1983 disclose a polymer dispersion type liquid crystal. In these publications, depending on the presence or non-presence of an electric field, a refractive index of the liquid crystal vis-à-vis the polymer is changed so as to change the liquid crystal between the scattered state and the transparent state thus enabling an image display.

However, in general, the refractive index of an organic material such as a liquid crystal or polymer is limited to within a narrow range, and its ratio is approximately 1.2 at maximum; hence, the back scattering ratio of the light scattering type liquid crystal display element is low, thereby making it difficult to obtain sufficient brightness. Accordingly, it becomes necessary to increase the thickness of the cell to obtain a large back scattering ratio. In this case, however, the drive voltage becomes extremely high and hence, the device becomes unrealistic.

In view of the above, a system in which a lower electrode of a scattering type liquid crystal layer has a mirror surface which is provided with a smooth rugged structure having a specific inclination angle is disclosed in Japanese Laid-Open Patent Publication 114,797/1996. Here, by effectively using incident light, the intensity of light reflected in the direction normal to the surface of the substrate can be increased without giving a scattering function to the reflection plate. However, this system is insufficient in the black display, and further, brightness at the white display is so insufficient that a paper white display cannot be obtained.

Besides the above-mentioned methods, methods which combine the scatter-type liquid crystal with various optical elements have been proposed by several publications, including the following publications. Japanese Laid-Open Patent Publication 317,702/1994 proposes a method which uses an inclined reflection plate and an inclined light absorption body. Japanese Laid-Open Patent Publication 87,006/1996 proposes a method in which light scattering means such as a prism is provided between a scatter-type liquid crystal layer and a colored plate. Japanese Laid-Open Patent Publication 62778/1998 proposes a method in which a low refractive index layer is placed on a back reflection plate. However, all of these methods have a deterioration in visual angle characteristics and are poor in brightness.

SUMMARY OF THE INVENTION

The present invention has been made in view of the above problems and it is an object of the present invention to provide a liquid crystal display device which is capable of obtaining a high brightness and a high contrast ratio without a polarizer or with a single polarizer.

To achieve the above-mentioned object, a reflection-type liquid crystal display device according to the present invention includes upper and lower substrates which respectively have upper and lower electrodes, the upper and lower substrates being arranged in parallel with the upper electrode facing the lower electrode; and a liquid crystal layer sandwiched between the upper and lower substrates, the upper substrate being transparent and having protruding portions adjacent to the liquid crystal layer, each protruding portion having a surface downwardly inclined to defined a prism, the lower substrate having light reflection portions and light absorption portions, wherein when an electric field is applied to the liquid crystal layer, incident light into the upper substrate is selectively directed to the light reflection portions and the light absorption portions by means of the protruding portions and the liquid crystal layer.

Due to such a constitution, in displaying a bright state, the incident light from the outside is directed to be incident on the light reflection portions so that the light is reflected to a viewer side and thereby a sufficient brightness can be obtained. On the other hand, in displaying a dark state, the incident light is directed to be incident on the light absorption portions so that the light is not reflected to the viewer side and thereby a sufficiently high contrast ratio can be obtained.

Further, a transmission-type liquid crystal display device according to the present invention includes upper and lower substrates which respectively have upper and lower electrodes, the upper and lower substrates being arranged in parallel with the upper electrode facing the lower electrode; and a liquid crystal layer sandwiched between the upper and lower substrates, the upper substrate being transparent and having protruding portions adjacent to the liquid crystal layer, each protruding portion having a surface downwardly inclined to defined a prism, the lower substrate having light reflection portions and light absorption portions, wherein when an electric field is applied to the liquid crystal layer, incident light into the upper substrate is selectively directed to the light transmission portions and the light absorption portions by means of the protruding portions and the liquid crystal layer.

Due to such a constitution, in displaying a bright state, incident light from the outside to the device is directed to be incident on the light transmission portions so that the light is transmitted to a viewer side and thereby a sufficient brightness can be obtained. On the other hand, in displaying a dark state, the incident light is directed to be incident on the light absorption portions so that the light does not reach the viewer side and thereby a sufficiently high contrast ratio can be obtained.

DETAILED DESCRIPTION OF THE PREFERRED EMBODIMENTS

In the reflection-type and transmission-type liquid crystal display devices of the present invention, the lower substrate may be transparent, each light reflection portion may be a light reflection film laminated on the lower substrate and each light absorption portion may be a light absorption wall perpendicularly embedded into the lower substrate.

The light absorption wall may be made of a black resin. Each light reflection portion may be a light interference film. Each protruding portion may define a prism having a triangular cross section. Adjacent two of the protruding portions may define a prism having an isosceles triangular cross section or a trapezoid cross section. The display device may include a diffused-vertical light transfer plate, the plate being laid on the upper substrate.

Most kinds of common nematic liquid crystals having refractive index anisotropy ($\Delta n$) can be applied to the liquid crystal layer. However, in consideration of easy formation of the device, materials having greater refractive index anisotropy are more suitable. Examples thereof include TL-213 ($\Delta n=0.239$), E-7 ($\Delta n=0.225$), BL-003 ($\Delta n=0.261$), BL-006 ($\Delta n=0.286$), BL-009 ($\Delta n=0.291$), BL-011 ($\Delta n=0.278$), BL-015 ($\Delta n=0.281$), BL-036 ($\Delta n=0.267$), BL-037 ($\Delta n=0.282$) and BL-038 ($\Delta n=0.272$) manufactured by Merck, as well as PAL-746 ($\Delta n=0.266$) manufactured by Dainippon Ink & Chemicals, Inc.

Materials of the upper and lower substrates of the present invention include not only glass but plastic made of polyether sulfone, polyethylene terephthalate, polycarbonate, epoxy resin, acrylic resin and the like.

The light reflection portions may be made of aluminum or silver of high refractivity and the light absorption portions may be made of chrome or nickel of low refractivity, and both may be formed into films by sputtering, evaporation or plating. One of them may be formed on another film, or both films may be formed on the same plane. They a may be re provided only to necessary regions through the steps of applying a photosensitive resist, light exposure, development, etching and removal of the resist. The light absorption portions can be made of a resist of a black resin.

The diffused-vertical light transfer plate is, for example, a fiber plate or a microlens made of transparent materials such as glass (non-alkali glass, quartz, etc.), plastic, resin and crystal. Examples of commercially available plate materials include a fiber plate 194HMF (Mitsubishi Rayon Co. Ltd.) made of a bundle of microscopic optical fibers and a planar microlens PML or EML (Nippon Sheet Glass Co., Ltd.)

The light interference film of the present invention may be made by laminating a plurality of layers each having a light wavelength order thickness. Reflection lights from the upper and the lower surfaces of the layered structure are interfered with each other so that colored reflection lights are observed (Bragg reflection is utilized). In general, the light interference film may be formed by "interfering light exposure" in which lights each having a wavelength corresponding to that required by a photo-curing resin are cast from two directions with respect to the substrate. Materials thereof include a hologram recording film HRF 700X manufactured by Dupont containing a binder polymer, an acrylate monomer and a polymerization initiator.

Materials of the light absorption wall of the present invention include a carbon black, a mixture of a carbon black and a resin such as an acrylic resin, a black resist or the like.

Figure 1:
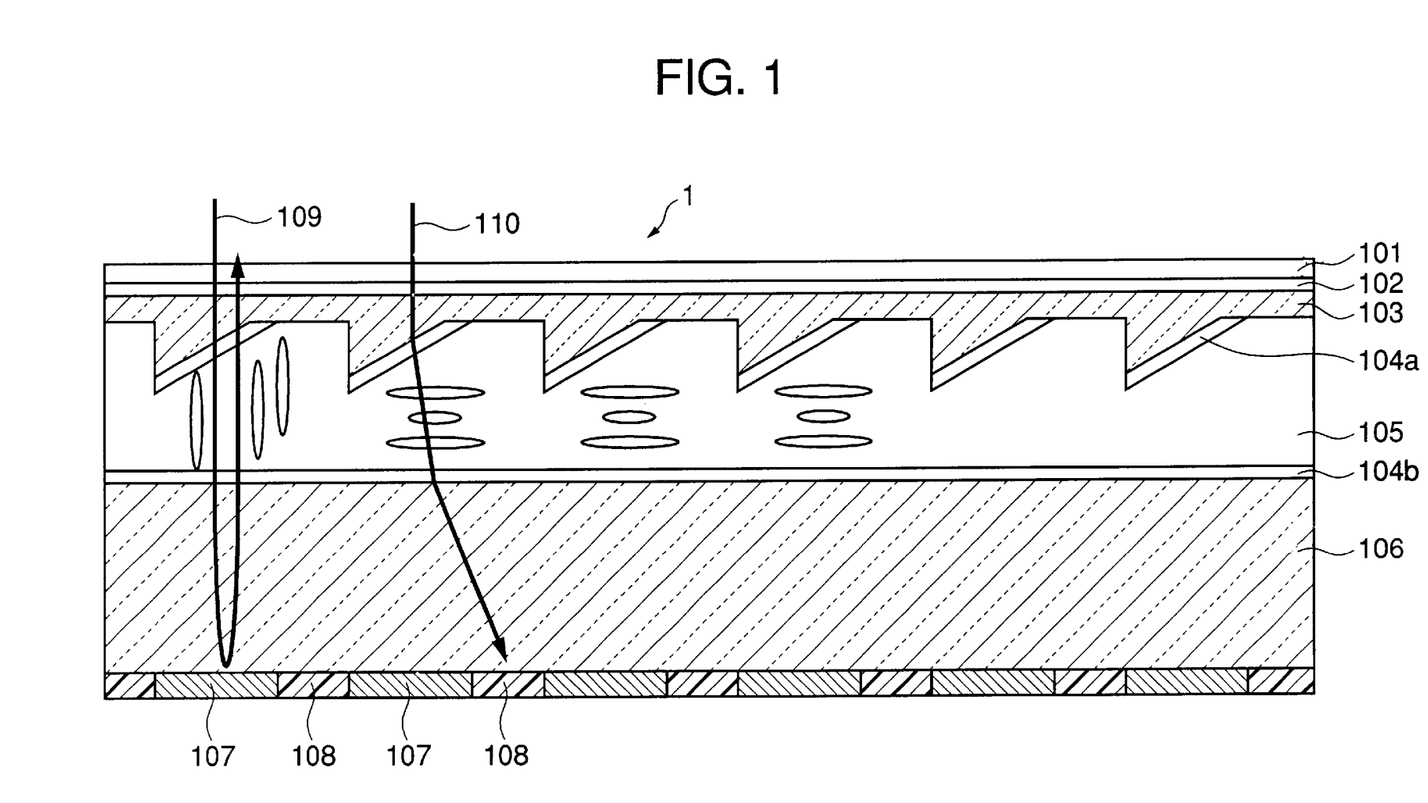
FIG. 1 is a schematic cross-sectional view of a reflection-type liquid crystal display device according to the present invention.
Figure 9:
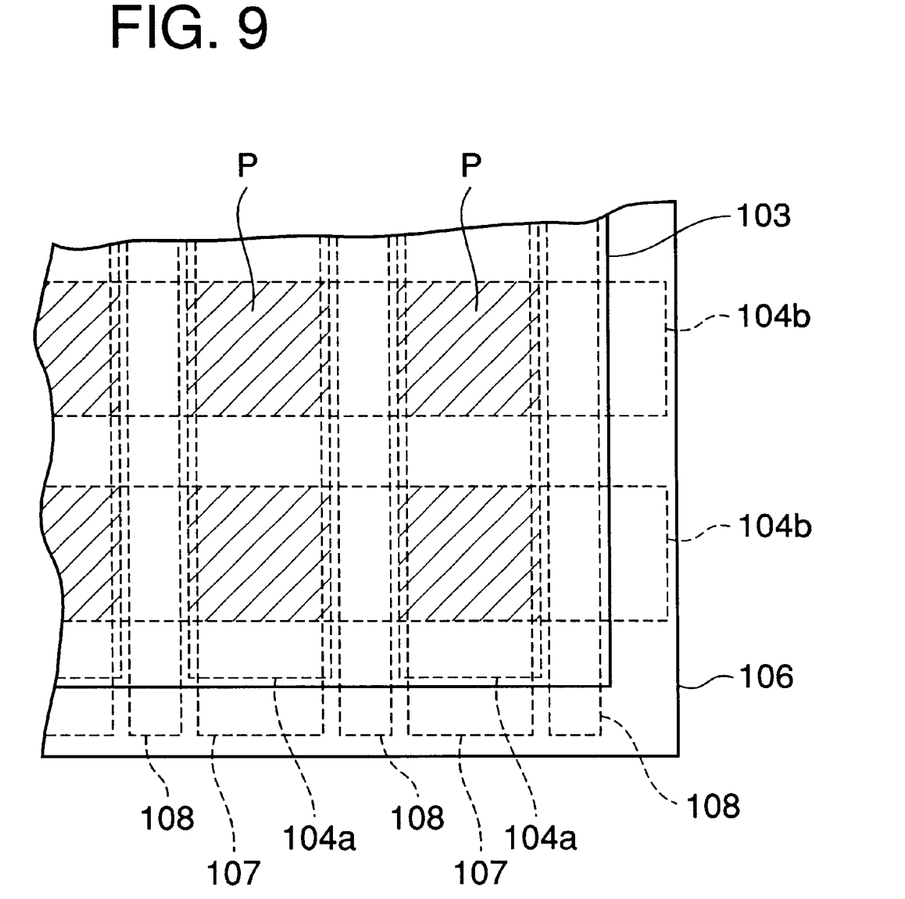
FIG. 9 is a partial pan view of the display device shown in FIG. 1.

Embodiments of the present invention are explained hereinafter in conjunction with attached drawings. FIGS. 1 and 9 are a schematic cross-sectional view and a partial plan view of a reflection-type liquid crystal display device according to the present invention.

A reflection-type liquid crystal display device 1 includes a transparent upper substrate 103 having serrated protruding portions thereon and a transparent flat lower substrate 106. The upper substrate 103 has transparent upper electrodes 104a arranged on the protruding portions and the lower substrate 106 has transparent lower electrodes 104b crossing the upper electrodes 104a so that crossing parts of electrodes 104a and 104b define pixels P (FIG. 9). Each protruding portion of the upper substrate 103 has a surface downwardly inclined to define a prism. The lower substrate 106 has light reflection portions 107 and light absorption portions 108 on its lower surface. A liquid crystal layer 105 is sandwiched between the upper substrate 103 and the lower substrate 106.

Upon switching on or off of an electric field applied to the liquid crystal layer 105, liquid crystal molecules in the liquid crystal layer 105 are changed between a state in which the liquid crystal molecules are aligned perpendicular to the lower substrate 106 and a state in which the liquid crystal molecules are aligned parallel to the lower substrate 106.

Here, it is assumed that a refractive index ng of the substrates 103, 106 and a refractive index no of the liquid crystal in the molecule short axis direction are agree with each other and a refractive index ne of the liquid crystal in the molecule long axis direction satisfies ne>no.

When the liquid crystal molecules are aligned perpendicular to the lower substrate 106, light incident on the upper substrate 103 goes straight on as shown by numeral 109 and is reflected by the light reflection portions 107 and then goes outside the display device 1 through the upper substrate 103.

On the other hand, when the liquid crystal molecules are aligned parallel to the lower substrate 106, the light is deflected through the upper and lower substrates having the refractive index ng and the liquid crystal layer having the refractive index (ne+no)/2 as indicated by an optical path 110. Then, the light goes to the light absorption portion 108 so that the light is absorbed and not irradiated to the outside. The refractive index of the liquid crystal is continuously controlled by the electric field so that a half tone display can be realized by adjusting an incident light amount ratio between the light reflection portions and the light absorption portions.

When this liquid crystal display device 1 is used as a reflection-type projector element or the like, since the incident angle of light to the display device 1 is preliminarily set constant, it is sufficient for the liquid crystal display device to control angles of the incident light and the irradiated light by using the above-mentioned constitution. However, when this liquid crystal display device is used as a direct-viewing reflection-type liquid crystal display device, it is preferable to arrange a diffused-vertical light transfer plate 102 on an upper surface of the upper substrate 103. Further, it is preferable to arrange a light diffusion plate 101 on the diffused-vertical light transfer plate 102 to enhance visual angle characteristics. The light diffusion plate 101 is made of a transparent material such as glass, polyester, polycarbonate, polyolefin, polyether sulfone, polyethylene terephthalate, polyacrylate, epoxy resin or the like, and has a surface with irregularities in micron to submicron order.

In the state where the liquid crystal is arranged parallel to the lower substrate 106, the orientation of the liquid crystal may be in a random state. In this case, however, a defect occurs and this defect gives rise to a problem that the light is scattered. Accordingly, in such a case, a small amount of chiral agent may preferably be added to the liquid crystal so as to make the liquid crystal have a helical structure. Further, by coating liquid crystal orientation films on the upper and lower substrates 103, 106 and then applying rubbing or irradiation of light to the liquid crystal orientation films, it may be possible to give a uniaxial property to the liquid crystal molecules when they are arranged parallel to the lower substrate 106. In this case, by arranging a sheet of polarizer on an upper surface of the liquid crystal layer 105 such that the polarizing axis thereof is aligned with the molecule long axis direction of the liquid crystal, it may be possible to control the incident light such that the incident light is deflected at a largerer angle between the upper and lower substrates 103, 106 having the refractive index ng and the liquid crystal layer having the refractive index ne.

In the constitution shown in FIG. 1, when an area ratio between the light reflection portions and the light absorption portions is simply 1 to 1, an aperture ratio is 50%. Accordingly, a brightness higher than that (transmissivity 40% of the polarizer×the aperture ratio 80% of the polarizer) of a case which uses the polarizer can be obtained. However, this brightness is less than optimal.

Figure 2:
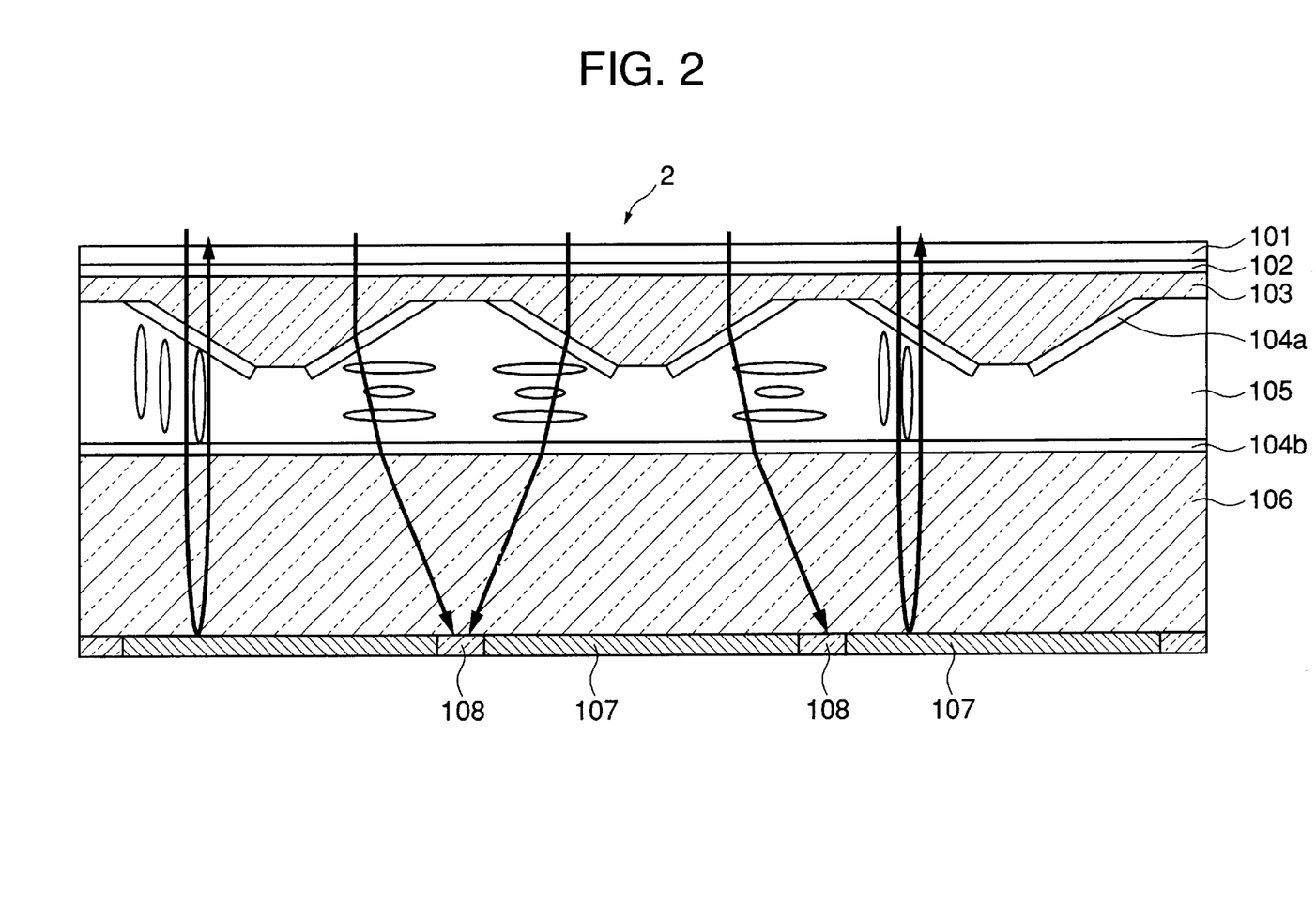
FIG. 2 is a schematic cross-sectional view of a reflection-type liquid crystal display device according to the present invention.

Accordingly, as shown in FIG. 2, by regarding two neighboring pixels P as one couple and integrating their prisms into a trapezoid prism such that the inclined surfaces of the prisms face each other in an opposed manner, each light absorption portion 108 on which the light is incident in the dark state can be shared by two pixels. Accordingly, theoretically, the aperture ratio can be increased up to 67%.

Figure 3:
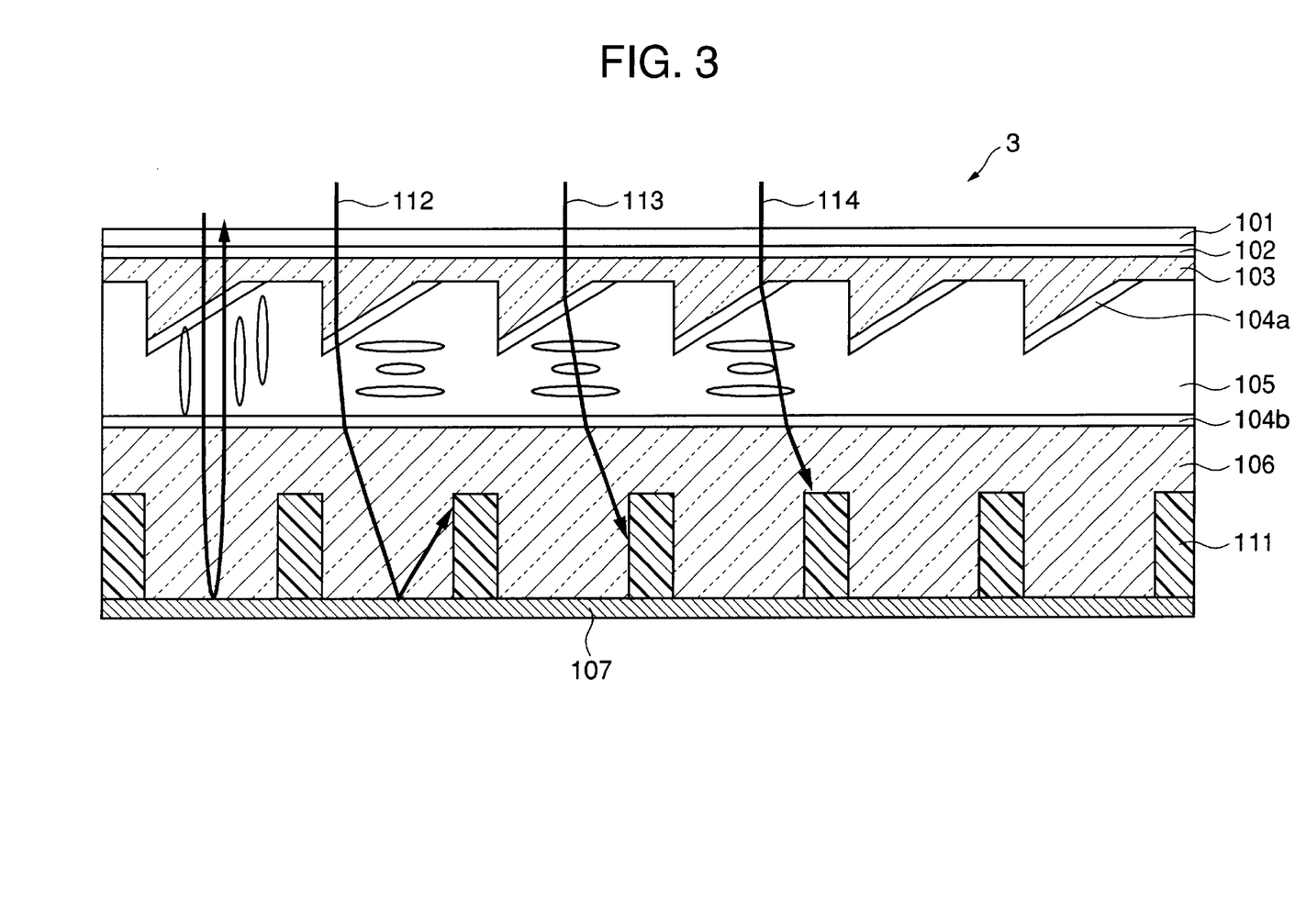
FIG. 3 is a schematic cross-sectional view of a reflection-type liquid crystal display device according to the present invention.

Then, to realize a higher aperture ratio, each light absorption portion 111 is configured to a wall standing perpendicularly in the lower substrate 106 as shown in FIG. 3. A higher aperture ratio can be obtained using such a constitution. Further, at the time of a dark state in display, it becomes possible to make the incident light take three optical paths before it is absorbed by the wall 111. That is, the incident light going along an optical path 112 is once reflected by the reflection portion 107, and then is absorbed by a side surface of the wall 111. The incident light going along an optical path 113 is irradiated through the liquid crystal layer 105 and is directly absorbed by the side surface of the wall 111. The incident light going along an optical path 114 is irradiated through the liquid crystal layer 105 and is directly absorbed by an upper surface of the wall 111. Due to such a constitution, an inclination angle of the prisms can be made small so that the thickness of the liquid crystal layer 105 can be made thinner, and so that the uniform orientation of the liquid crystal can be further enhanced.

Figure 4:
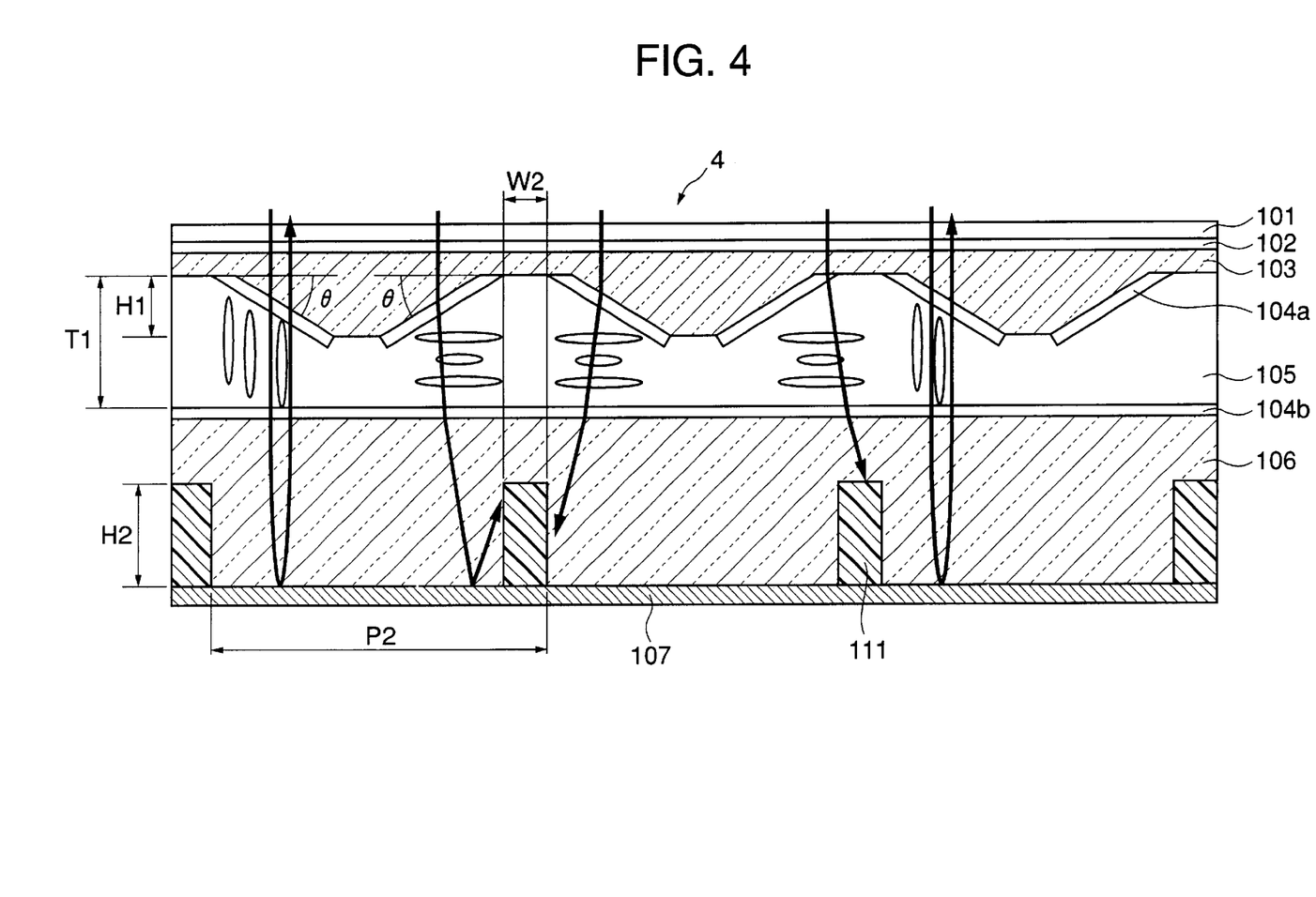
FIG. 4 is a schematic cross-sectional view of a reflection-type liquid crystal display device according to the present invention.

Using a constitution shown in FIG. 4, the number of the walls 111 can be reduced to one half of that of the constitution shown in FIG. 3.

Figure 5:
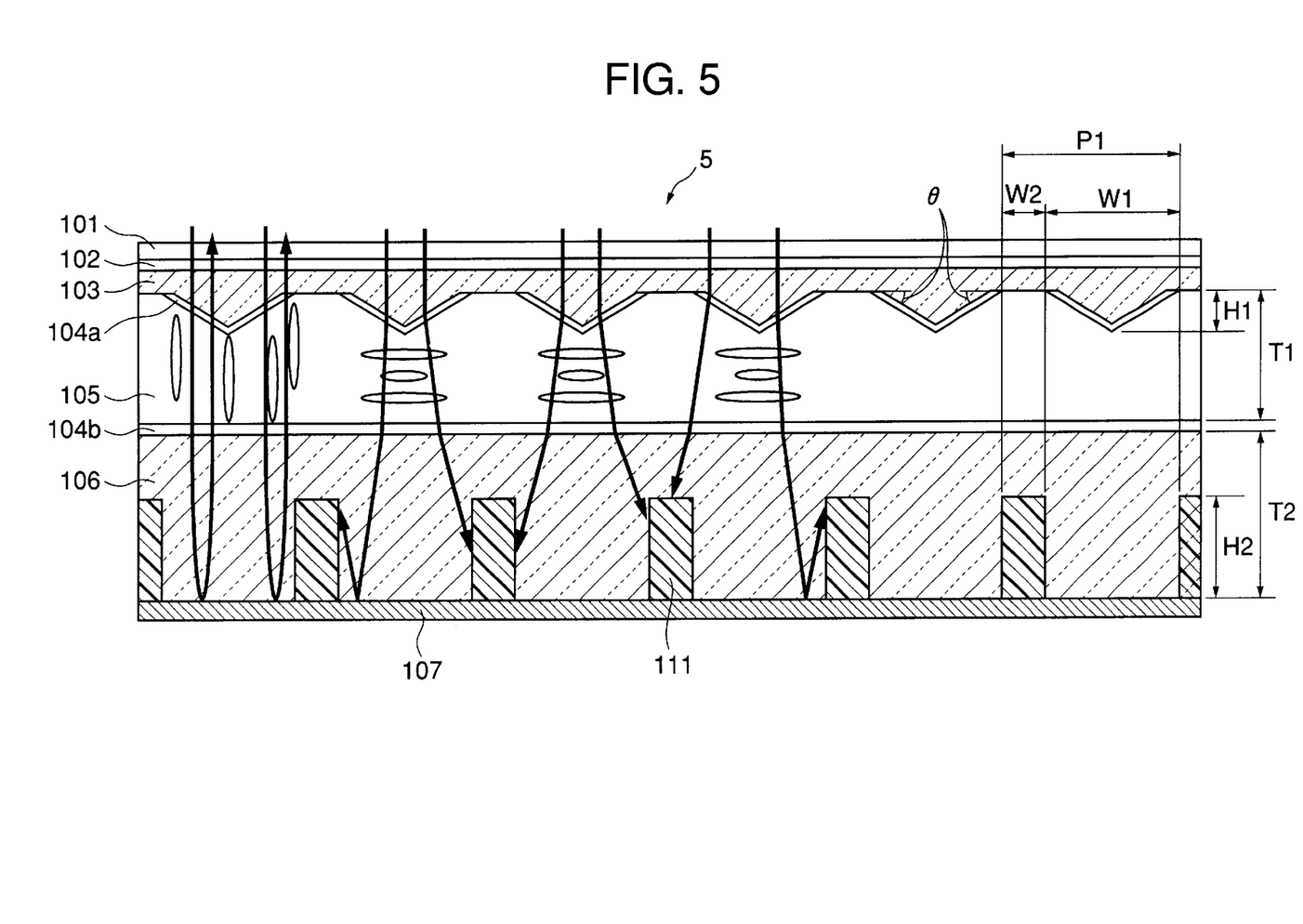
FIG. 5 is a schematic cross-sectional view of a reflection-type liquid crystal display device according to the present invention.

Further, as shown in FIG. 5, by arranging an isosceles triangular prism which protrudes downwardly for each pixel P on the liquid crystal layer side of the upper substrate 103, it becomes possible to make the inclination angle of the prism (i.e. the height of the prism) further smaller. In this manner, the shape of the prism can be varied widely. It is possible that not only the shape of the upper substrate but also the shape of the lower substrate is changed or that the upper and the lower substrates are both simultaneously provided with such prisms.

Due to the constitutions of the reflection-type liquid crystal display devices 1–5 which are show in FIG. 1 to FIG. 5, a white and black display having higher brightness and a higher contrast ratio can be obtained. To modify such a reflection-type display device into a color liquid crystal display device, a color filter may be arranged behind or in front of the liquid crystal layer. To obtain the further higher brightness, it is preferable to use light interference films as the light reflection portions 107 shown in FIG. 1.

Further, constitutions similar to the above-mentioned constitutions are applicable to a transmission-type liquid crystal display device. These constitutions will be explained hereinafter.

Figure 6:
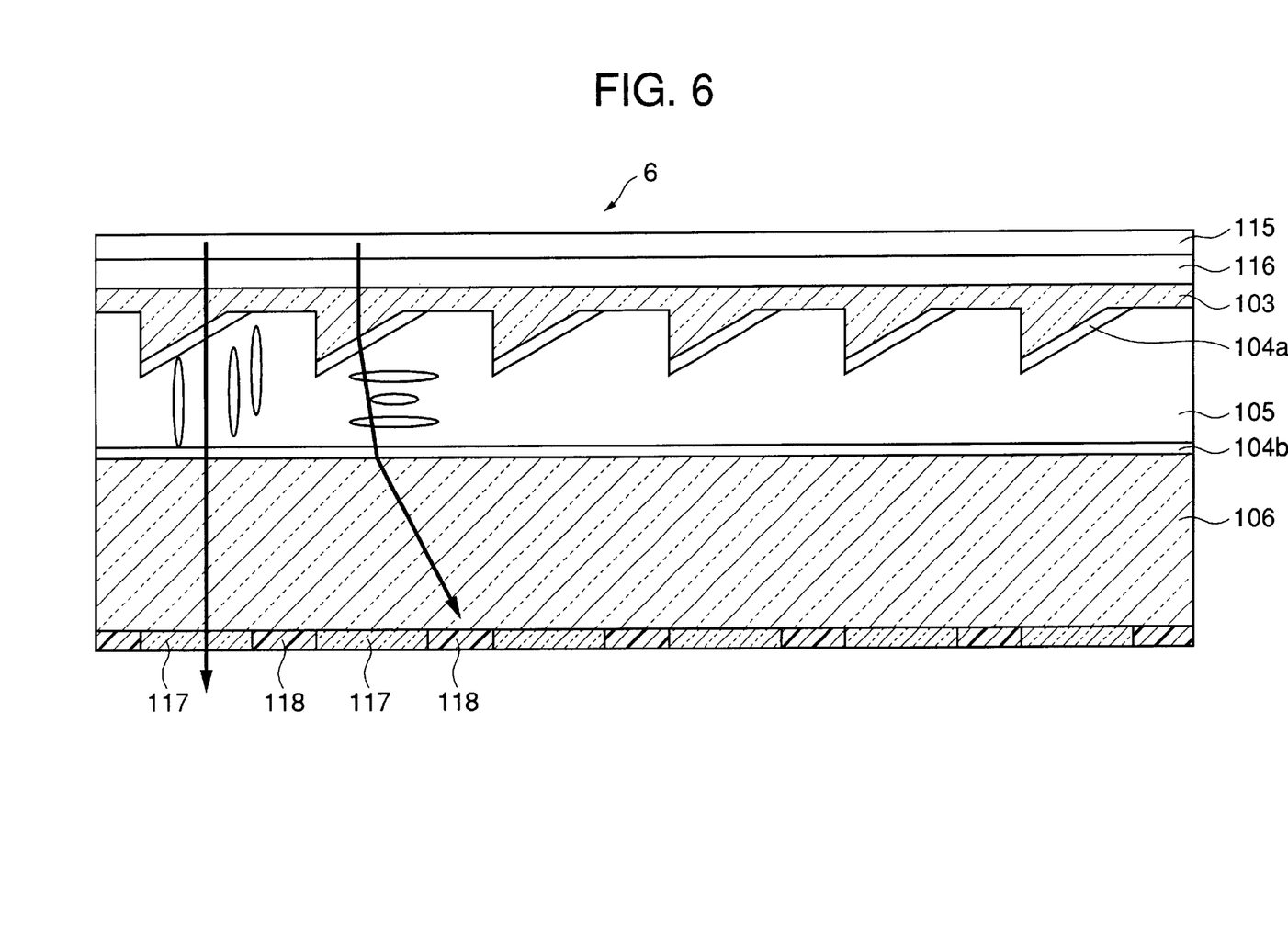
FIG. 6 is a schematic cross-sectional view of a transmission-type liquid crystal display device according to the present invention.

FIG. 6 is a schematic cross-sectional view of the transmission-type liquid crystal display device according to the present invention. The constitution of the display device 6 is substantially the same as that of the reflection-type liquid crystal display device 1 shown in FIG. 1. With respect to light irradiated from a light source (backlight) 115, targets to be irradiated with the light are changed between light transmission portions 117 and light absorption portion 118 by applying an electric field to the liquid crystal layer 105. The refractive index of the liquid crystal layer 105 can be continuously controlled by adjusting the electric field and hence, a half tone display can be realized by adjusting the incident light amount ratio between the light transmission portions 117 and the light absorption portions 118.

When the display device 6 is used as a transmission-type projector element or the like, since the incident angle of light to the display device 6 is preliminarily set constant, it is sufficient for the display device 6 to control angles of the incident light and the irradiated light by using the above-mentioned constitution. However, when this liquid crystal display device is used as a direct-viewing transmission-type liquid crystal display device, it is preferable to arrange a diffused-vertical light transfer plate 116 on an upper surface of the upper substrate 103. Further, it is effective to arrange a directional film which conforms with the purpose at the light irradiating side (viewer side) to enhance the visual angle characteristics.

Figure 7:
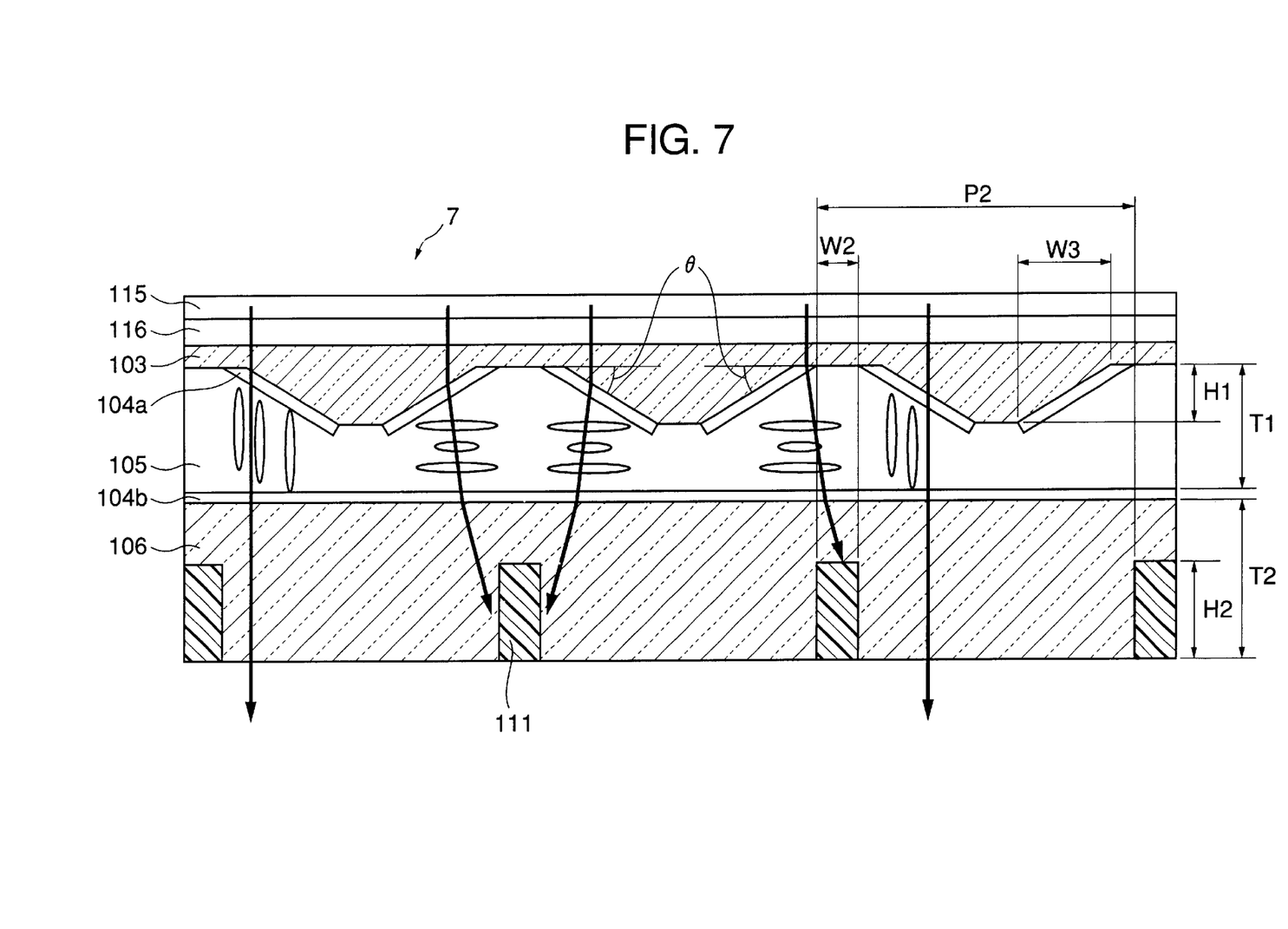
FIG. 7 is a schematic cross-sectional view of a transmission-type liquid crystal display device according to the present invention.
Figure 8:
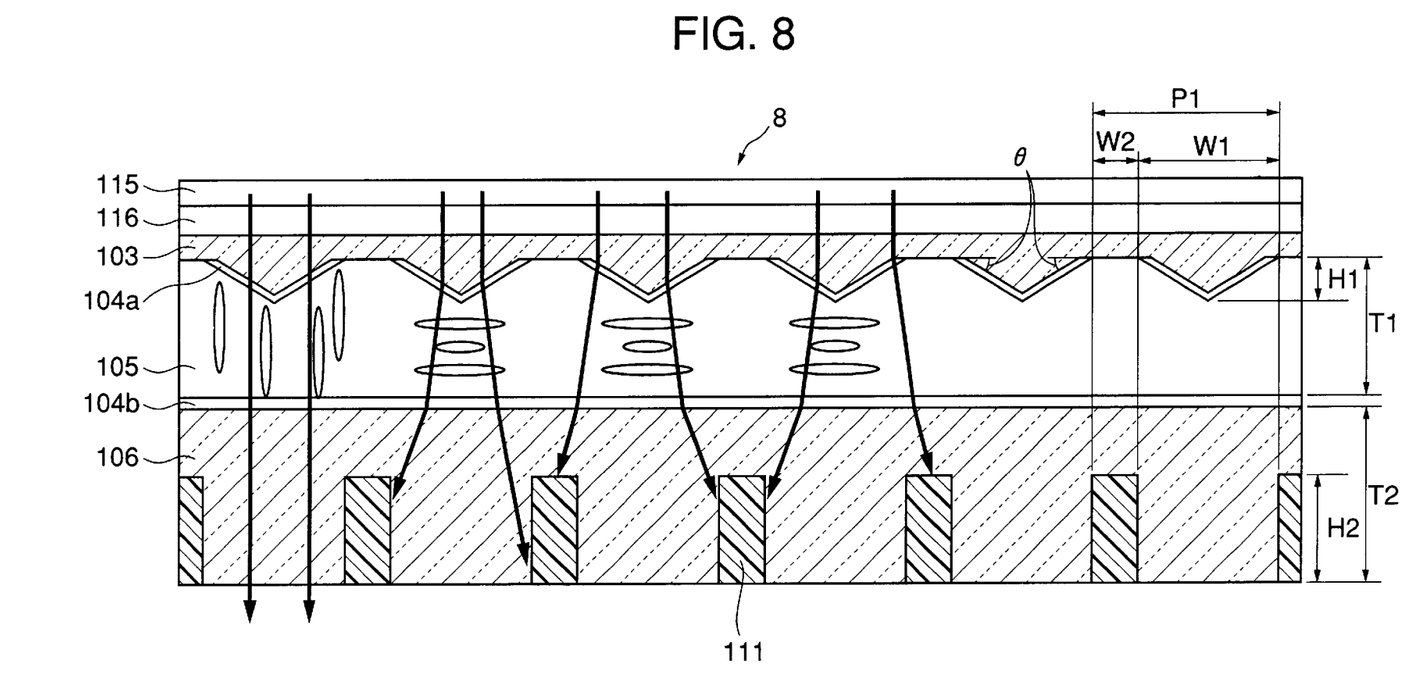
FIG. 8 is a schematic cross-sectional view of a transmission-type liquid crystal display device according to the present invention.

With respect to other constitutions and features, such as the operation principle of the fundamental optical path switching, the case of using a single polarizer, the shape of prisms, the aperture ratio, the color display and the like, they are similar to those of the reflection-type liquid crystal display devices 1–5. For example, as shown in FIG. 7 and FIG. 8, the light absorption portions adopt vertical walls 111 to the substrate to enhance the aperture ratio.

The further specific embodiments of the present invention will be explained hereinafter in detail.

Embodiment 1

An embodiment related to the reflection-type liquid crystal display device is explained using the schematic cross-sectional view of FIG. 5. As the liquid crystal, a nematic liquid crystal having a positive dielectric anisotropy and having a refractive index of ne=1.83, no=1.53 (for example, BL-009 (ne=1.82, no=1.53) produced by Merck Ltd.) into which a small amount of chiral agent S-811 is added is used. As shown in FIG. 5, the pixel pitch P1 is 100 μm and the width W1 of the aperture portions is 80 μm (with an aperture ratio of 80%). At the aperture portions, V-shaped protrusions, i.e. isosceles triangle prisms having a width of 80 μm each are protruded from the upper substrate 103 into the liquid crystal layer 105. Each of the protrusions has a height H1 of 13 μm and an inclination angle θ of 18°. Such a structure of the upper-substrate 103 can be produced by cutting a glass substrate, and also the structure can be obtained by molding an acrylic resin using a metallic mold. Here, the thickness T1 of the liquid crystal layer is set to 18 μm.

The transparent electrodes 104a, 104b are made of ITO (Indium Tin Oxide). With respect to the transparent electrodes 104a, 104b, only on the surface the transparent electrodes 104b of the lower substrate 106, a horizontal orientation film is coated and subjected to a rubbing treatment. Although a slight defect of disclination line may be observed when the electric field is not applied, an approximately uniform orientation state is obtained. Further, since the cholestric helical pitch is several μm to several tens of μm, coloring due to selective reflection is not observed.

The liquid crystal used here may be a material having a negative dielectric anisotropy. In this case, although a vertical orientation film is used as an orientation film, since at least one of the upper and lower substrates 103, 106 adopts inclined surfaces, there is no irregularities of the orientation at the time of applying the electric field and hence, it is unnecessary to provide an orientation treatment such as rubbing or the like.

Further, the upper and lower substrates 103, 106 are made of generally-used glass substrates 7059 and have a thickness of 1100 μm and a refractive index of ng=1.53 which is approximately equal to the refractive index no of the liquid crystal. Below horizontal portions having a width W2 of 20 μm of the upper substrate 103, black resins (light absorption walls) having a width W2 of 20 μm and a height H2 of 340 μm are embedded in the lower substrate 106 to define the wall 111 at a pitch P1 of 100 μm. This structure of the lower substrate 106 is obtained by digging a glass substrate to form grooves having a width of 20 μm and a depth of 340 μm by sand blasting and then by injecting a ultraviolet ray curable black resin in the grooves and thereafter by performing a ultraviolet ray irradiation to cure the black resin using a patterned mask.

The digging of the glass substrate may be performed by an abrasion method using an excimer laser, a dry etching method and an ion milling method. Further, transparent silicon resin films having a thickness corresponding to the size and pitch of the pixels P and thin films (for example, aluminum films) having both surfaces coated in black and a thickness corresponding to that of the wall are alternately laminated, then they are subjected to a heat pressing by a lamination processing to be changed to a panel, then the panel are sliced in the direction perpendicular to the laminating direction so as to obtain the lower substrate 106 having light absorption walls 111 which penetrate in the panel cross-sectional direction.

Further, an optical fiber plate is arranged on an upper surface of the substrate as the diffused-vertical light transfer plate 102 and the light diffusion plate 101 is arranged on the optical fiber plate.

The liquid crystal takes the horizontal orientation state in the initial state and the refractive index with respect to the vertical incident light becomes (ne+no)/2=1.68. As a result, the light incident on the lower substrate 106 from the liquid crystal layer 105 is irradiated at an inclination angle of approximately 1.6° to closer one of the black walls 111. As a result, substantially the whole incident light is absorbed by the black walls 111 by way of the deflected optical paths shown in FIG. 5 and hence, the dark state is obtained. On the other hand, when the sufficient electric field is applied to the liquid crystal layer 105, the liquid crystal molecules are oriented perpendicular to the lower substrate 106 and the incident light is reflected toward the viewer side so that the bright state having the high brightness is obtained.

Embodiment 2

A second embodiment which relates to the reflection-type liquid crystal display device is explained in conjunction with the schematic cross-sectional view shown in FIG. 4.

Although the fundamental structure of this embodiment is similar to that of the embodiment shown in FIG. 5, this embodiment differs from the embodiment shown in FIG. 5 with respect to the shape of prisms and the specification of the light absorption walls. That is, each prism is formed such that a right-angled triangular shaped protruding portion having a width of 80 $\mu$m at the aperture portion (a short side of a trapezoid defined when two pixels are considered to be coupled) is protruded in the liquid crystal layer 105 from the upper substrate 103. The prism has a height H1 of 40 $\mu$m and an inclination angle θ of 26.5°. Here, the thickness T1 of the liquid crystal layer 105 is set to 50 $\mu$m. Below a horizontal portion which formed a head side of each trapezoid shape having a width W2 of 20 $\mu$m, the light absorption wall 111 having a width W1 of 20 $\mu$m and a height H2 of 535 $\mu$m is embedded at a pitch P2 of 200 $\mu$m in the lower substrate 106.

Due to such a constitution, in the state that the liquid crystal is orientated parallel to the lower substrate 106, the light is completely incident on the light absorption walls 111 and the dark state which prevents the light from being irradiated to the viewer is obtained. Further, when a sufficient electric field is applied, the liquid crystal molecules are oriented in the direction perpendicular to the lower substrate 106 and the incident light is reflected to the viewer side so that the bright state having the high brightness is obtained.

Embodiment 3

Subsequently, an embodiment of the present invention which relates to the transmission-type liquid crystal display device is explained in conjunction with the schematic cross-sectional view shown in FIG. 8.

Although the fundamental structure of this embodiment is similar to that of the reflection-type liquid crystal display device 5 shown in FIG. 5, this embodiment differs from the embodiment shown in FIG. 5 with respect to the shape of the prisms and the specification of the light absorption walls 111. That is, each prism is formed such that a V-shaped protruding portion having a width W1 of 80 $\mu$m at the aperture portion is protruded in the liquid crystal layer 105 from the upper substrate 103. The prism has a height H1 of 15.4 $\mu$m and a inclination angle θ of 21°. Here, the thickness T1 of the liquid crystal layer 105 is set to 20 $\mu$m. Below a horizontal portion having a width W2 of 20 $\mu$m of the upper substrate 103, the light absorption wall 111 having a width W2 of 20 $\mu$m and a height H2 of 560 $\mu$m is embedded at a pitch P1 of 100 $\mu$m in the lower substrate 106.

Due to such a constitution, in the state that the liquid crystal is orientated parallel to the lower substrate 106, the light is completely incident on the light absorption walls 11 and the dark state which prevents the light from being irradiated to the viewer side is obtained. Further, when a sufficient electric field is applied, the liquid crystal molecules are oriented in the direction perpendicular to the substrate 106, the incident light reaches the light transmission portion so that a bright state having high brightness is obtained.

Embodiment 4

A second embodiment which relates to the transmission-type liquid crystal display device of the present invention is explained in conjunction with the schematic cross-sectional view shown in FIG. 7.

Although the fundamental structure of this embodiment is similar to that of the reflection-type liquid crystal display device 4 shown in FIG. 4, this embodiment differs from the embodiment shown in FIG. 4 with respect to the shape of the prisms and the specification of the light absorption walls 111. That is, each prism portion is formed such that a right-angled triangular shaped protruding portion having a width H1 of 80 $\mu$m at the aperture portion (a short side of a trapezoid defined when two pixels are considered to be coupled) is protruded in the liquid crystal layer 105 from the upper substrate 103. The prism has a height H1 of 63 $\mu$m and an inclination angle θ of 38°. Here, the thickness T1 of the liquid crystal layer 105 is set to 70 $\mu$m. Below a horizontal portion which formed a head side of each trapezoid shape having a width W2 of 20 $\mu$m of the upper substrate, the light absorption wall 111 having a width W2 of 20 $\mu$m and a height H2 of 830 $\mu$m is embedded at a pitch P2 of 200 $\mu$m in the lower substrate 106.

Due to such a constitution, in the state that the liquid crystal is orientated parallel to the lower substrate 106, the light is completely incident on the light absorption walls 111 and the dark state which prevents the light from being irradiated to the viewer side is obtained. Further, when the sufficient electric field is applied, the liquid crystal molecules are oriented in the direction perpendicular to the lower substrate 106, the incident light reaches the light transmission portion so that the bright state having a high brightness is obtained.

As has been described heretofore, according to the liquid crystal display devices of the present invention, the constitution without a polarizer or with a single polarizer can realize high brightness and contrast in which by applying an electric field to the liquid crystal layer, the optical path of the irradiated light after passing the liquid crystal layer is changed between the light reflection portions (or the light transmission portions) and the light absorption portions.

Further, by arranging the light reflection portions (in case of the reflection-type liquid crystal) or the light transmission portions (in case of the transmission-type liquid crystal) parallel to the substrates and by arranging the light absorption portions perpendicular to the substrates, the higher brightness can be realized.

The liquid crystal display device of the invention is applicable to the reflection-type and the transmission-type direct-viewing liquid crystal displays, the projection-type liquid crystal projectors, the optical information processing devices and the like.

What is claimed is:

1. A reflection-type liquid crystal display device comprising:

upper and lower substrates which respectively have upper and lower electrodes, the upper and lower substrates being arranged in parallel with the upper electrode facing the lower electrode; and a liquid crystal layer sandwiched between the upper and lower substrates;

the upper substrate being transparent and having protruding portions adjacent to the liquid crystal layer, each protruding portion having a surface downwardly inclined to defined a prism, the lower substrate having light reflection portions and light absorption portions which are located solely at an area of the lower surface of the lower substrate, wherein when an electric field is switched on and off, liquid crystal molecules are aligned perpendicular and parallel respectively to the lower substrate, so that light from the protruding portions is directed to the light reflection portions and the light absorption portion respectively.

2. A reflection-type liquid crystal display device comprising:

upper and lower substrates which respectively have upper and lower electrodes, the upper and lower substrates being arranged in parallel with the upper electrode facing the lower electrode; and a liquid crystal layer sandwiched between the upper and lower substrates;

the upper substrate being transparent and having protruding portions adjacent to the liquid crystal layer, each protruding portion having a surface downwardly inclined to defined a prism, the lower substrate having light reflection portions and light absorption portions, so that when an electric field is switched on and off, liquid crystal molecules are aligned perpendicular and parallel respectively to the lower substrate, so that light from the protruding portions is directed to the light reflection portions and the light absorption portion respectively, wherein the lower substrate is transparent, each light reflection portion is a light reflection film laminated on the lower substrate and each light absorption portion is a light absorption wall perpendicularly embedded into the lower substrate.

3. The display device of claim 2, wherein the light absorption wall is made of a black resin.

4. The display device of claim 1, wherein each light reflection portion is a light interference film.

5. The display device of claim 1, wherein the prism of each protruding portion has a triangular cross section.

6. The display device of claim 1, wherein adjacent two of the protruding portions define a prism having an isosceles triangular cross section.

7. The display device of claim 1, wherein adjacent two of the protruding portions defines a prism having a trapezoid cross section.

8. The display device of claim 1 further comprising a diffused-vertical light transfer plate, the plate being laid on the upper substrate.

\* \* \* \* \*